(12) United States Patent
Nonaka et al.

(10) Patent No.: US 7,390,544 B2
(45) Date of Patent: Jun. 24, 2008

(54) THERMOSETTING ADHESIVE OR PRESSURE-SENSITIVE ADHESIVE TAPE OR SHEET, AND PROCESS OF PRODUCING THE SAME

(75) Inventors: Takahiro Nonaka, Ibaraki (JP); Miyoko Sonobe, Ibaraki (JP); Masahiro Ohura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 55 days.

(21) Appl. No.: 11/067,682

(22) Filed: Mar. 1, 2005

(65) Prior Publication Data
US 2005/0196574 A1 Sep. 8, 2005

(30) Foreign Application Priority Data
Mar. 2, 2004 (JP) .................. P. 2004-057101

(51) Int. Cl.
*B32B 9/00* (2006.01)
*B32B 33/00* (2006.01)
*B32B 7/12* (2006.01)

(52) U.S. Cl. .................. 428/40.1; 428/343; 428/352

(58) Field of Classification Search ............ 428/40.1, 428/218–220, 343, 352
See application file for complete search history.

(56) References Cited

U.S. PATENT DOCUMENTS

| | | | |
|---|---|---|---|
| 3,822,175 A | 7/1974 | Yuan | |
| 3,900,662 A | 8/1975 | Yuan | |
| 4,425,176 A | 1/1984 | Shibano et al. | |
| 5,817,386 A | 10/1998 | Adamko et al. | |
| 5,948,517 A | 9/1999 | Adamko et al. | |
| 6,228,449 B1 | 5/2001 | Meyer | |
| 6,348,249 B2 | 2/2002 | Meyer | |
| 6,395,360 B1 | 5/2002 | Takahira et al. | |
| 6,982,107 B1 * | 1/2006 | Hennen | 428/40.1 |

FOREIGN PATENT DOCUMENTS

| | | |
|---|---|---|
| CN | 1366544 A | 8/2002 |
| EP | 0 816 462 A1 | 1/1998 |
| EP | 0 835 916 A2 | 4/1998 |
| GB | 1259459 A * | 1/1972 |
| JP | 50-85636 A | 7/1975 |
| JP | 61-103976 A | 5/1986 |
| JP | 4-45135 A | 2/1992 |
| JP | 5051569 A | 3/1993 |
| JP | 5-329985 A | 12/1993 |
| JP | 6-33022 A | 2/1994 |
| JP | 6-99551 A | 4/1994 |
| JP | 6-155687 A | 6/1994 |
| JP | 8-27441 A | 1/1996 |
| JP | 9-12985 A | 1/1997 |
| JP | 10-86289 A | 4/1998 |
| JP | 10-114036 A | 5/1998 |
| JP | 10-338896 A | 12/1998 |
| JP | 11-29751 A | 2/1999 |
| JP | 11-228920 A | 8/1999 |
| JP | 2000-108271 A | 4/2000 |
| JP | 2000-119411 A | 4/2000 |
| JP | 2000-248237 A | 9/2000 |
| WO | WO 95/20635 A2 | 8/1995 |
| WO | WO 01/32797 A1 | 5/2001 |

OTHER PUBLICATIONS

Chinese Office Action dated Feb. 16, 2007.

* cited by examiner

*Primary Examiner*—Patricia L Nordmeyer
(74) *Attorney, Agent, or Firm*—Sughrue Mion, PLLC

(57) ABSTRACT

The thermosetting adhesive or pressure-sensitive adhesive tape or sheet has a structure in which a thermosetting adhesive or pressure-sensitive adhesive layer made of a thermosetting adhesive or pressure-sensitive adhesive composition containing an acrylic polymer (X) containing at least an alkyl(meth) acrylate (a) in which the alkyl moiety thereof has from 2 to 14 carbon atoms and a cyano group-containing monomer (b) as monomer components and a phenol resin (Y) is protected by a release liner which does not substantially contain a silicone component. The acrylic polymer (X) may further contain a carboxyl group-containing monomer (c) as a monomer component. A release liner having a release layer made of polyethylene is suitable as the release liner which does not substantially contain a silicone component.

7 Claims, No Drawings

THERMOSETTING ADHESIVE OR PRESSURE-SENSITIVE ADHESIVE TAPE OR SHEET, AND PROCESS OF PRODUCING THE SAME

FIELD OF THE INVENTION

The present invention relates to a thermosetting adhesive or pressure-sensitive adhesive tape or sheet and to a process of producing the same. In more detail, the invention relates to a thermosetting adhesive or pressure-sensitive adhesive tape or sheet which can be suitably used in flexible printing circuit boards and the like and to a process of producing the same.

BACKGROUND OF THE INVENTION

In electronic instruments, a flexible printing circuit board (sometimes referred to as "FPC") is widely utilized. In such an FPC, an adhesive is used in (1) a step of adhering and laminating a conductive metal foil (for example, copper foils and aluminum foils) on a heat-resistant substrate (for example, polyimide-made substrates and polyamide-made substrates) to prepare FPC or (2) a step of adhering FPC to a reinforcing plate (such as aluminum plates, stainless steel plates, and polyimide plates). As such an adhesive to be used in adhesion of FPC, there have hitherto been widely utilized nitrile rubber (NBR)/epoxy resin based adhesives, acrylic rubber/epoxy resin based adhesives, and acrylic rubber/phenol resin based adhesives (see U.S. Pat. Nos. 3,822,175 and 3,900,662).

However, in adhesives containing an epoxy resin, such as nitrile rubber (NBR)/epoxy resin based adhesives and acrylic rubber/epoxy resin based adhesives, though their adhesive strength is thoroughly satisfactory, since the adhesiveness is revealed by a chemical reaction of the epoxy resin, there is encountered a problem that the storage stability as an adhesive is low.

Also, in recent years, FPC has been used in precision electronic parts (instruments). Depending upon applications of FPC, in order to prevent contact failure from occurring, it is demanded to exclude silicone based materials even in adhesive tapes or sheets to be used in adhesion with respect to FPC.

SUMMARY OF THE INVENTION

Thus, an object of the invention is to provide a thermosetting adhesive or pressure-sensitive adhesive tape or sheet which has good stability with time of a thermosetting adhesive or pressure-sensitive adhesive layer and which does not substantially contain a silicone based material and a process of producing the same.

Another object of the invention is to provide a thermosetting adhesive or pressure-sensitive adhesive tape or sheet which is useful as a thermosetting adhesive or pressure-sensitive adhesive tape or sheet to be used in adhesion with respect to flexible printing circuit boards and a process of producing the same.

In order to achieve the foregoing objects, the present inventors made extensive and intensive investigations. As a result, it has been found that by using a thermosetting adhesive or pressure-sensitive adhesive composition comprising a combination of a specific acrylic polymer with a phenol resin as a thermosetting adhesive or pressure-sensitive adhesive composition for forming a thermosetting adhesive or pressure-sensitive adhesive layer in a thermosetting adhesive or pressure-sensitive adhesive tape or sheet and protecting the thermosetting adhesive or pressure-sensitive adhesive layer by a specific release liner, a thermosetting adhesive or pressure-sensitive adhesive tape or sheet which has good stability with time of a thermosetting adhesive or pressure-sensitive adhesive layer and which does not substantially contain a silicone based material is obtained. The invention has been accomplished based on such a finding.

Specifically, the invention is to provide a thermo-setting adhesive or pressure-sensitive adhesive tape or sheet having a structure in which a thermosetting adhesive or pressure-sensitive adhesive layer made of a thermosetting adhesive or pressure-sensitive adhesive composition containing an acrylic polymer (X) containing at least an alkyl(meth)acrylate (a) in which the alkyl moiety thereof has from 2 to 14 carbon atoms and a cyano group-containing monomer (b) as monomer components and a phenol resin (Y) is protected by a release liner which does not substantially contain a silicone component.

It is preferable that the acrylic polymer (X) further contains a carboxyl group-containing monomer (c) as a monomer component.

Also, as the release liner which does not substantially contain a silicone component, a release liner having a release layer made of polyethylene is suitable. The polyethylene preferably has a specific gravity of from 0.910 to 0.940. Also, the release layer made of polyethylene preferably has a thickness of from 20 to 30 μm.

Further, in the acrylic polymer (X), it is preferable that a proportion of the alkyl(meth)acrylate (a) in which the alkyl moiety thereof has from 2 to 14 carbon atoms to the cyano group-containing monomer (b) to the carboxyl group-containing monomer (c) is (60 to 75)/(20 to 35)/(0.5 to 10) by weight in terms of a ratio of component (a)/component (b)/component (c).

Such a thermosetting adhesive or pressure-sensitive adhesive tape or sheet can be suitably used in adhesion with respect to flexible printing circuit boards.

Also, the invention is to provide a process of producing the foregoing thermosetting adhesive or pressure-sensitive adhesive tape or sheet, which comprises coating a thermosetting adhesive or pressure-sensitive adhesive composition comprising a mixture of an acrylic polymer (X) containing at least an alkyl(meth)acrylate (a) in which the alkyl moiety thereof has from 2 to 14 carbon atoms and a cyano group-containing monomer (b) as monomer components and a phenol resin (Y) on the release surface of a release liner which does not substantially contain a silicone component and then drying to form a thermosetting adhesive or pressure-sensitive adhesive.

Since the thermosetting adhesive or pressure-sensitive adhesive tape or sheet of the invention has the foregoing construction, it has good stability with time of a thermosetting adhesive or pressure-sensitive adhesive layer and does not substantially contain a silicone based material. Therefore, the thermosetting adhesive or pressure-sensitive adhesive tape or sheet of the invention is used as a thermosetting adhesive or pressure-sensitive adhesive tape or sheet to be used in adhesion with respect to flexible printing circuit boards.

DETAILED DESCRIPTION OF THE INVENTION

Release Liner

In the invention, it is important to use a release liner which does not substantially contain a silicone component as the release liner for protecting the thermosetting adhesive or pressure-sensitive adhesive layer in the thermosetting adhesive or pressure-sensitive adhesive tape or sheet. In this way, by using a release liner which does not substantially contain a silicone component as the release liner, there is nothing of transfer of a silicone component caused by the release liner into the thermosetting adhesive or pressure-sensitive adhesive layer protected by the release liner. For that reason, even when an adherend which is adhered by the thermosetting adhesive or pressure-sensitive adhesive tape or sheet is a precision electronic instrument such as flexible printing circuit boards (FPC), it is possible to prevent inconveniences caused due to the silicone component, such as contact fault, from occurring.

As the release liner which does not substantially contain a silicone component, a release liner in which a silicone based release treating agent is not used as a release treating agent can be suitably used. Examples of such a release liner in which a silicone based release treating agent is not used include (1) a release liner having a construction formed of only a plastic film having high releasability itself (sometimes referred to as "highly releasable plastic film"), (2) a release liner having a construction in which a release layer made of a raw material of a highly releasable plastic film (sometimes referred to as "plastic release layer") is formed on at least one surface of a support of every kind, and (3) a release liner having a construction in which a release treating agent layer (mold release treating agent layer) made of a release treating agent other than silicone based release treating agents is formed on at least one surface of a support of every kind.

The release liner of the foregoing construction (1) is constructed of a single material of a highly releasable plastic film. Examples of the highly releasable plastic film include plastic films such as polyolefin based films made of a polyolefin based resin and fluorine based films made of a fluorine based resin [for example, films made of Teflon (a registered trade mark)]. In the polyolefin based films, examples of the polyolefin based resin which can be used include polyethylene (for example, low density polyethylene and linear low density polyethylene), polypropylene, ethylene-α-olefin copolymers (block copolymers or random copolymers) such as an ethylene-propylene copolymers, and mixtures thereof.

Also, the release liner of the foregoing construction (2) is constructed of a support (substrate) of every kind and a plastic release layer (a release layer made of a raw material of a highly releasable plastic film) formed on at least one surface (both surfaces or one surface) of the support. The plastic material for forming the plastic release layer can be properly selected and used among raw materials in the plastic film enumerated as the highly releasable plastic film of the release liner in the foregoing construction (1). Specifically, examples of the plastic material for forming the plastic release layer include polyolefin based resins and fluorine based resins such as polyethylene (for example, low density polyethylene and linear low density polyethylene), polypropylene, ethylene-α-olefin copolymers (block co-polymers or random copolymers) such as an ethylene-propylene copolymers, and mixtures thereof.

The support of every kind is not particularly limited. Examples thereof include various substrates such as paper-made substrates, plastic-made substrates, metal-made substrates, and fibrous material-made substrates. The paper-made substrate is not particularly limited so far as it is a general paper-made substrate. Examples thereof include papers such as wood-free paper, craft paper, Clupak paper, glassine paper, Japanese paper, and western paper. The plastic-made substrate is not particularly limited, and examples thereof include plastic films such as polyester based films (for example, polyethylene terephthalate based films), polyimide based films, polyolefin based films (for example, polypropylene based films and polyethylene based films), and polycarbonate based films, laminates of these films, and metal vapor-deposited plastic films. The metal-made substrate is not particularly limited, and examples thereof include metal foils such as copper foils and aluminum foils. The fibrous material-made substrate is not particularly limited, and examples thereof include non-woven fabrics and cloths.

The release liner of the construction (2) can be prepared by forming a plastic release layer on at least one surface of the support by laminating the highly releasable plastic film or coating a raw material of the highly releasable plastic film. For the lamination or coating, known lamination processes or coating processes (for example, a heat lamination process and a coating process by heat melt extrusion) can be employed.

Moreover, the release liner of the foregoing construction (3) is constructed of a support (substrate) of every kind and a release treating agent layer formed on at least one surface (both surfaces or one surface) of the support. The release treating agent for forming the release treating agent layer is not particularly limited so far as it is a release treating agent other than silicone based release treating agents. Examples thereof include fluorine based release treating agents and long chain alkyl based release treating agents. Also, the support can be properly selected and used among supports enumerated as the support in the foregoing construction (2) (for example, paper-made substrates, plastic-made substrates, metal-made substrates, and fibrous material-made substrates). The release liner of the construction (3) can be prepared by coating the release treating agent on at least one surface of the support.

In the invention, as the release liner, the release liner of the construction (1) (that is, a release liner made of a single material of a highly releasable plastic film) and the release liner of the construction (2) (that is, a release liner having a plastic release layer) can be suitably used; and the release liner of the construction (2) can be especially suitably used.

In the release liner made of a single material of a highly releasable plastic film or the release liner having a plastic release layer, as the highly releasable plastic film or raw material thereof, polyolefin based films made of a polyolefin based resin or polyolefin based resins are suitable. As such a polyolefin based resin, polyethylene can be suitably used. Accordingly, as the release liner, a release liner made of a single material of polyethylene and a release liner having a release layer made of polyethylene can be suitably used.

In the release liner made of a single material of polyethylene or the release liner having a release layer made of polyethylene, in particular, the polyethylene is preferably polyethylene having a specific gravity (or density) of from 0.910 to 0.940. When the specific gravity (or density) of polyethylene is less than 0.910, the heat resistance is lowered, and therefore, such is not preferable. On the other hand, when it exceeds 0.940, the adhesiveness to the support (especially, a paper-made substrate) is lowered, and therefore, such is not preferable, too.

Also, in the case of the release liner having a plastic release liner, it is preferable that the thickness of the release layer made of polyethylene is from 20 to 30 μm. When the thickness of the release liner made of polyethylene is less than 20 μm, the heat resistance is lowered so that at the time of temporary lamination in adhering the thermosetting adhesive or pressure-sensitive adhesive tape or sheet, the release liner may possibly cause blister at the time of heating by heat lamination, and therefore, such is not preferable. On the other hand, when it exceeds 30 μm, the release liner becomes expensive, and therefore, such is not economically preferable.

Thermosetting Adhesive or Pressure-sensitive Adhesive Layer

As described previously, the thermosetting adhesive or pressure-sensitive adhesive tape or sheet of the invention has a structure in which the thermosetting adhesive or pressure-sensitive adhesive layer is protected by a release liner which does not substantially contain a silicone component, and the thermosetting adhesive or pressure-sensitive adhesive layer is formed of a thermosetting adhesive or pressure-sensitive adhesive composition containing an acrylic polymer (X) containing at least an alkyl(meth)acrylate (a) in which the alkyl moiety thereof has from 2 to 14 carbon atoms [sometimes referred to as "$C_{2-14}$ alkyl(meth)acrylate (a)"] and a cyano group-containing monomer (b) as monomer components and a phenol resin (Y).

Acrylic Polymer (X)

The acrylic polymer (X) is an acrylic polymer containing at least a $C_{2-14}$ alkyl(meth)acrylate (a) and a cyano group-containing monomer (b) as monomer components and optionally, using a carboxyl group-containing monomer (c) or other monomer components.

$C_{2-14}$ Alkyl(meth)acrylate (a)

The $C_{2-14}$ alkyl(meth)acrylate (a) is not particularly limited so far as it is an alkyl(meth)acrylate (an alkyl acrylate or an alkyl methacrylate) in which the alkyl moiety thereof has from 2 to 14 carbon atoms. Examples of the $C_{2-14}$ alkyl(meth)acrylate (a) include ethyl(meth)acrylate, propyl(meth)acrylate, isopropyl(meth)acrylate, n-butyl(meth)acrylate, isobutyl(meth)acrylate, s-butyl(meth)acrylate, t-butyl(meth)acrylate, pentyl(meth)acrylate, isopentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, tridecyl(meth)acrylate, and tetradecyl(meth)acrylate.

As the $C_{2-14}$ alkyl(meth)acrylate (a), alkyl(meth)acrylates having from 4 to 12 carbon atoms are suitable. In particular, ethyl acrylate, n-butyl acrylate, and 2-ethylhexyl acrylate can be suitably used.

The $C_{2-14}$ alkyl(meth)acrylate (a) may be constituted singly or in admixture of two or more kinds thereof. That is, as the $C_{2-14}$ alkyl(meth)acrylate (a), at least one alkyl(meth)acrylate selected among alkyl(meth)acrylates in which the alkyl moiety thereof has from 2 to 14 carbon atoms can be used.

In the invention, the $C_{2-14}$ alkyl(meth)acrylate (a) is used as the major component of monomers for constituting the acrylic polymer (X). It is preferable that the proportion of the $C_{2-14}$ alkyl(meth)acrylate (a) is from 60 to 75% by weight based on the total amount of monomer components.

Cyano Group-containing Monomer (b)

The cyano group-containing monomer (b) is not particularly limited so far as it is a monomer containing a cyano group. Examples thereof include acrylonitrile and methacrylonitrile. As the cyano group-containing monomer (b), acrylonitrile can be suitably used.

The cyano group-containing monomer (b) may be constituted singly or in admixture of two or more kinds thereof.

In the invention, the cyano group-containing monomer (b) is used for the purpose of improving the heat resistance and adhesiveness. For that reason, it is important that the proportion of the cyano group-containing monomer (b) is from 20 to 35% by weight based on the total amount of monomer components. When the proportion of the cyano group-containing monomer (b) is less than 20% by weight based on the total amount of monomer components, the heat resistance becomes poor, whereas when it exceeds 35% by weight, the flexibility is inferior, and therefore, the both is not preferable.

Carboxyl Group-containing Monomer (c)

The carboxyl group-containing monomer (c) is not particularly limited so far as it is a monomer containing a carboxyl group. Examples thereof include (meth)acrylic acid (acrylic acid or methacrylic acid), itaconic acid, maleic acid, fumaric acid, and crotonic acid. Also, acid anhydrides of these carboxyl group-containing monomers (for example, acid anhydride group-containing monomers such as maleic anhydride and itaconic anhydride) can be used as the carboxyl group-containing monomer (c). As the carboxyl group-containing monomer (c), acrylic acid, methacrylic acid, and itaconic acid can be suitably used.

The carboxyl group-containing monomer (c) may be constituted singly or in admixture of two or more kinds thereof.

In the invention, the carboxyl group-containing monomer (c) is optionally used for the purpose of improving the adhesiveness. For that reason, it is preferable that the proportion of the carboxyl group-containing monomer (c) is not more than 10% by weight (for example, from 0.5 to 10% by weight) based on the total amount of monomer components. When the proportion of the carboxyl group-containing monomer (c) exceeds 10% by weight based on the total amount of monomer components, the flexibility is inferior, and therefore, such is not preferable.

Other Monomer Components

If desired, monomer components (copolymerizable monomers) which are copolymerizable with the $C_{2-14}$ alkyl(meth)acrylate (a) and the cyano group-containing monomer (b) and the carboxyl group-containing monomer (c) which is optionally used may be used as a monomer component constituting the acrylic polymer (X). Examples of such copolymerizable monomers include methyl(meth)acrylate; $C_{15-20}$ alkyl(meth)acrylates such as pentadecyl(meth)acrylate, hexadecyl(meth)acrylate, heptadecyl(meth)acrylate, octadecyl(meth)acrylate, nonadecyl(meth)acrylate, and eicosyl(meth)acrylate; non-aromatic ring-containing (meth)acrylates such as cycloalkyl(meth)acrylates [for example, cyclohexyl(meth)acrylate] and isobornyl(meth)acrylate; aromatic ring-containing (meth)acrylates such as aryl(meth)acrylates [for example, phenyl(meth)acrylate], aryloxyalkyl(meth)acrylates [for example, phenoxyethyl(meth)acrylate], and arylalkyl(meth)acrylates [for example, benzyl(meth)acrylate]; epoxy group-containing acrylic monomers such as glycidyl(meth)acrylate and methylglycidyl(meth)acrylate; vinyl ester based monomers such as vinyl acetate and vinyl propionate; styrene based monomers such as styrene and α-methylstyrene; hydroxyl group-containing monomers such as hydroxyethyl(meth)acrylate, hydroxypropyl(meth)acrylate, and hydroxybutyl(meth)acrylate; alkoxyalkyl(meth)acrylate based monomers such as methoxyethyl(meth)acrylate and ethoxyethyl(meth)acrylate; aminoalkyl(meth)acrylate based monomers such as aminoethyl(meth)acrylate, N,N-dimethylaminoethyl(meth)acrylate, and t-butylaminoethyl(meth)acrylate; (N-substituted) amide based monomers such as (meth)acrylamide, N,N-dimethyl(meth)acrylamide, N-butyl(meth)acrylamide, and N-hydroxy(meth)acrylamide; olefin based monomers such as ethylene, propylene, isoprene, and butadiene; and vinyl ether based monomers such as methyl vinyl ether.

Also, in the acrylic based polymer (X), polyfunctional monomers such as hexanediol di(meth)acrylate, (poly)ethylene glycol di(meth)acrylate, (poly)propylene glycol di(meth)

acrylate, neopentyl glycol di(meth)acrylate, pentaerythritol di(meth)acrylate, glycerin di(meth)acrylate, trimethylolpropane tri(meth)acrylate, pentaerythritol tri(meth)acrylate, dipentaerythritol hexa(meth)acrylate, epoxy acrylate, polyester acrylate, urethane acrylate, divinylbenzene, butyl di(meth)acrylate, and hexyl di(meth)acrylate can be used as the copolymerizable monomer.

The acrylic based polymer (X) can be prepared by known or common polymerization processes (for example, a solution polymerization process, an emulsion polymerization process, a suspension polymerization process, a block polymerization process, and a polymerization process upon irradiation of UV rays).

A polymerization initiator, a chain transfer agent, and so on, which are used in the polymerization of the acrylic polymer (X), are not particularly limited but can be properly selected and used among those which are known or common. More specifically, examples of the polymerization initiator include azo based polymerization initiators such as 2,2'-azobisisobutyronitrile, 2,2'-azobis(4-methoxy-2,4-dimethylvaleronitrile), 2,2'-azobis-(2,4-dimethylvaleronitrile), 2,2'-azobis(2-methylbutyronitrile), 1,1'-azobis(cyclohexane-1-carbonitrile), 2,2'-azobis(2,4,4-trimethylpentane), and dimethyl-2,2'-azobis(2-methylpropionate); and peroxide based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. The polymerization initiator can be used singly or in combinations of two or more kinds thereof. The amount of the polymerization initiator to be used can be properly selected within the range which is usually used.

Also, examples of the chain transfer agent include 2-mercaptoethanol, lauryl mercaptan, glycidyl mercaptan, mercaptoacetic acid, 2-ethylhexyl thioglycolate, 2,3-di-mercapto-1-propanol, and α-methylstyrene dimer.

In the solution polymerization, various general solvents can be used. Examples of such solvents include organic solvents, for example, esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. The solvent can be used singly or in combinations of two or more kinds thereof.

The weight average molecular weight of the acrylic polymer (X) is not particularly limited but for example, can be properly selected within the range of from 100,000 to 1,000,000 (preferably from 200,000 to 800,000). The weight average molecular weight of the acrylic polymer (X) can be controlled by the kinds and use amounts of the polymerization initiator and the chain transfer agent, the temperature and time of the polymerization, and others such as the concentration of monomer and the dropping rate of monomer. The weight average molecular weight of the acrylic polymer (X) can be measured by, for example, gel permeation chromatography (GPC). In this case, the measurement conditions are not particularly limited but can be properly selected among known measurement conditions.

Phenol Resin (Y)

The phenol resin (Y) is not particularly limited so far as it is a phenol resin but can be properly selected and used among resol type phenol resins, novolak type phenol resins, and various modified phenol resins (for example, alkyl-modified phenol resins). The phenol resin (Y) can be used singly or in combinations of two or more kinds thereof.

As the phenol resin (Y), resol type phenol resins are preferable. In particular, a carbolic acid based resol type phenol resin represented by the following formula (1) can be suitably used.

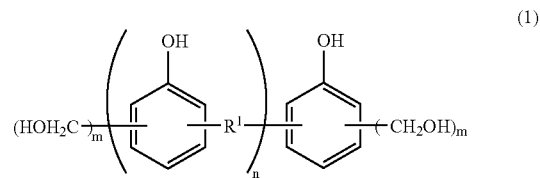

In the formula (1), $R^1$ represents —$CH_2$— or —$CH_2$—O—$CH_2$—; n represents a positive integer; and m represents an integer of from 1 to 4.

In the formula (1), n is not particularly limited so far as it is a positive integer but for example, can be selected among integers in the range of from 1 to 20. Also, m represents an integer of from 1 to 4.

It is preferable that the carbolic acid based resol type phenol resin is in the liquid state or balsam state at 50° C.

The phenol resin (Y) is used for the purpose of imparting thermosetting properties and heat resistance. The weight average molecular weight of the phenol resin (Y) is not particularly limited.

The proportion of the phenol resin (Y) to be blended is from 1 to 20 parts by weight (preferably from 5 to 15 parts by weight) based on 100 parts by weight of the acrylic polymer (X). When the proportion of the phenol resin (Y) is less than 1 part by weight based on 100 parts by weight of the acrylic polymer (X), the thermosetting properties are insufficient, whereas when it exceeds 20 parts by weight, the adhesive strength is lowered, and therefore, the both is not preferable.

Thermosetting Adhesive or Pressure-sensitive Adhesive Composition

The thermosetting adhesive or pressure-sensitive adhesive composition for forming the thermosetting adhesive or pressure-sensitive adhesive layer of the thermosetting adhesive or pressure-sensitive adhesive tape or sheet of the invention contains the foregoing acrylic polymer (X) and the foregoing phenol resin (Y). In the thermosetting adhesive or pressure-sensitive adhesive composition, with respect to the proportion of the acrylic polymer (X) and the phenol resin (Y), as described previously, the amount of the phenol resin (Y) is from 1 to 20 parts by weight (preferably from 5 to 15 parts by weight) based on 100 parts by weight of the acrylic polymer (X).

In the thermosetting adhesive or pressure-sensitive adhesive composition, if desired, known additives such as an antiaging agent, a filler, a coloring agent (for example, pigments and dyes), an ultraviolet absorber, an antioxidant, a crosslinking agent, a tackifier, a plasticizer, a softener, a surfactant, and an antistatic agent may be contained within the range where the characteristics of the invention are not impaired, in addition to the acrylic polymer (X) and the phenol resin (Y).

The thermosetting adhesive or pressure-sensitive adhesive composition can be prepared by mixing the acrylic polymer (X) and the phenol resin (Y) and optionally, various additives (for example, an antiaging agent, a filler, and a pigment), etc.

The acrylic polymer (X) and the phenol resin (Y) can be used in the solution or dispersion state. In the case where the acrylic polymer (X) is used in the solution state, a solvent is not particularly limited but for example, can be properly selected among the solvents enumerated as the solvent to be used for preparing the acrylic polymer (X) by solution polymerization. Also, in the case where the phenol resin (Y) is used in the solution state, a solvent is not particularly limited. For example, monohydric alcohols such as methanol, ethanol, propanol, isopropanol, and butanol; polyhydric alcohols such as ethylene glycol; ketones; acetic esters; and ethers can be used.

Thermosetting Adhesive or Pressure-sensitive Adhesive Tape or Sheet

The thermosetting adhesive or pressure-sensitive adhesive tape or sheet of the invention is a thermosetting adhesive or pressure-sensitive adhesive tape or sheet having a thermosetting adhesive or pressure-sensitive adhesive layer formed of the foregoing thermosetting adhesive or pressure-sensitive adhesive composition. So far as the thermosetting adhesive or pressure-sensitive adhesive tape or sheet has a thermosetting adhesive or pressure-sensitive adhesive layer comprising the foregoing thermosetting adhesive or pressure-sensitive adhesive composition, it may have a substrate or may not have a substrate. Accordingly, examples of the thermosetting adhesive or pressure-sensitive adhesive tape or sheet include (1) a thermosetting adhesive or pressure-sensitive adhesive tape or sheet having a construction formed of only the thermosetting adhesive or pressure-sensitive adhesive layer (substrate-less thermosetting adhesive or pressure-sensitive adhesive tape or sheet) and (2) a thermosetting adhesive or pressure-sensitive adhesive tape or sheet having a construction in which the thermosetting adhesive or pressure-sensitive adhesive layer is formed on at least one surface (both surfaces or one surface) of a substrate (substrate-provided thermosetting adhesive or pressure-sensitive adhesive tape or sheet). As the thermosetting adhesive or pressure-sensitive adhesive tape or sheet, a thermosetting adhesive or pressure-sensitive adhesive tape or sheet having the foregoing construction (1) (that is, a substrate-less thermosetting adhesive or pressure-sensitive adhesive tape or sheet having a construction formed of only the thermosetting adhesive or pressure-sensitive adhesive layer) is suitable.

In the invention, it is important that the thermo-setting adhesive or pressure-sensitive adhesive tape or sheet has a structure in which the thermosetting adhesive or pressure-sensitive adhesive layer is protected by the release liner which does not substantially contain a silicone component. In the case where the thermosetting adhesive or pressure-sensitive adhesive tape or sheet is a thermosetting adhesive or pressure-sensitive adhesive tape or sheet the both surfaces of which are an adhesive face, it is possible to protect the respective adhesive faces (surfaces of the thermosetting adhesive or pressure-sensitive adhesive layer) by one or two sheets of release liner (specifically, one sheet of release liner the both surfaces of which are a release surface, or two sheets of release liner at least one surface of which is a release surface).

In the case where the thermosetting adhesive or pressure-sensitive adhesive tape or sheet is a substrate-provided thermosetting adhesive or pressure-sensitive adhesive tape or sheet, so far as a thermosetting adhesive or pressure-sensitive adhesive layer comprising the foregoing thermosetting adhesive or pressure-sensitive adhesive composition is formed on at least one surface of a substrate, known pressure-sensitive adhesive layers, adhesive layers and the like may be formed on the other surface of the substrate.

Also, the thermosetting adhesive or pressure-sensitive adhesive tape or sheet may be formed in the wound state in the roll form, or the sheet may be formed in the laminated state. That is, the thermosetting adhesive or pressure-sensitive adhesive tape or sheet of the invention can have the state in the sheet form, tape form, etc.

In the thermosetting adhesive or pressure-sensitive adhesive tape or sheet of the invention, since the thermosetting adhesive or pressure-sensitive adhesive layer is formed of the foregoing thermosetting adhesive or pressure-sensitive adhesive composition, it is a thermosetting adhesive or pressure-sensitive adhesive layer having slight stickiness at the ambient temperature such that it can be stuck to an adherend and having adhesiveness such that when heated, a setting reaction is generated to increase an adhesive strength, whereby it can be firmly adhered to an adherend with excellent heat resistance. The thickness of the thermosetting adhesive or pressure-sensitive adhesive layer can be, for example, selected within the range of from 5 to 100 μm (preferably from 10 to 50 μm, and more preferably from 20 to 30 μm). The thermosetting adhesive or pressure-sensitive adhesive layer may have any state of a single layer or a laminate.

Also, in the case where the thermosetting adhesive or pressure-sensitive adhesive tape or sheet has a substrate, the substrate is not particularly limited. Examples thereof include appropriate thin sheet materials including paper based substrates such as papers; fiber based substrates such as cloths, non-woven fabrics, and nets; metal based substrates such as metal foils and metal plates; plastic based substrates such as films or sheets made of various resins (for example, olefin based resins, polyester based resins, polyvinyl chloride based resins, vinyl acetate based resins, amide based resins, polyimide based resins, polyetheretherketone (PEEK), and polyphenylene sulfide (PPS)); rubber based substrates (for example, rubber sheets); foamed articles (for example, foamed sheets); and laminates thereof (especially, laminates of a plastic based substrate and other substrate, and laminates of plastic films (or sheets) each other). The thickness of the substrate is not particularly limited but for example, may be from approximately 10 to 500 μm (preferably from 12 to 200 μm, and more preferably from 15 to 100 μm). The substrate may have the single-layered state or multilayered state. Also, if desired, the substrate may be subjected to various treatments such as a back face treatment, an antistatic treatment, and an undercoating treatment.

The thermosetting adhesive or pressure-sensitive adhesive tape or sheet may have other layers (for example, an interlayer and an undercoat layer) within the range where the effects of the invention are not impaired.

The thermosetting adhesive or pressure-sensitive adhesive tape or sheet of the invention can be produced according to usual production processes of adhesive tapes or sheets. For example, in the case where the thermosetting adhesive or pressure-sensitive adhesive tape or sheet is a substrate-less thermosetting adhesive or pressure-sensitive adhesive tape or sheet, it can be prepared by a process in which the foregoing thermosetting adhesive or pressure-sensitive adhesive composition is coated on the release surface of a release liner which does not substantially contain a silicone component in such a manner that the thickness after drying becomes a prescribed thickness and then dried to form a thermosetting adhesive or pressure-sensitive adhesive layer, and the release surface of other release liner which does not substantially contain a silicone component is then superimposed on the surface of the thermosetting adhesive or pressure-sensitive adhesive layer.

In coating the thermosetting adhesive or pressure-sensitive adhesive composition, common coaters (for example, a gravure roll coater, a reverse roll coater, a kiss roll coater, a dip roll coater, a bar coater, a knife coater, and a spray coater) can be used.

In the thermosetting adhesive or pressure-sensitive adhesive tape or sheet of the invention, since the thermosetting adhesive or pressure-sensitive adhesive layer is formed of the foregoing thermosetting adhesive or pressure-sensitive adhesive composition, it is excellent in the stability with time and has slight stickiness (slight tackiness). For that reason, it is excellent in the workability in positioning at the time of lamination, etc. Specifically, the thermosetting adhesive or pressure-sensitive adhesive tape or sheet can be subjected to temporary lamination at the ambient temperature and at this time, can be easily subjected to re-lamination. Thus, its lamination work is very simple so that the thermosetting adhesive or pressure-sensitive adhesive tape or sheet is excellent in the lamination workability. Also, when positioning is performed by temporary lamination and after lamination by sticking, setting reaction is caused by heating, it is possible to adhere a laminate resulting from sticking with excellent adhesiveness. Accordingly, in laminating the thermosetting adhesive or pressure-sensitive adhesive tape or sheet of the invention to an adherend by temporary lamination before setting by heating, it can be stuck to the adherend by temporary lamination while utilizing its slight stickiness. Also, after lamination by sticking, the thermosetting adhesive or pressure-sensitive adhesive tape or sheet is set by heating, whereby it can be firmly adhered to the adherend. Moreover, it can reveal excellent heat resistance after thermosetting.

In particular, since a release liner which does not substantially contain a silicone component is used as the release liner for protecting the thermosetting adhesive or pressure-sensitive adhesive layer, even when an adherend which is adhered by the thermosetting adhesive or pressure-sensitive adhesive tape or sheet is a precision electronic instrument such as flexible printing circuit boards (FPC), it is possible to prevent inconveniences caused due to the silicone component, such as contact fault, from occurring. Also, contamination caused due to a silicone component does not occur.

Also, in the case where a release liner using polyethylene having a specific gravity of from 0.910 to 0.940 in the release layer is used as the release liner which does not substantially contain a silicone component, in heating the thermosetting adhesive or pressure-sensitive adhesive tape or sheet in the laminated state on an adherend, blister of the release liner does not occur, and the heat resistance is excellent.

Accordingly, the thermosetting adhesive or pressure-sensitive adhesive tape or sheet of the invention can be suitably used in adhesion in precision electronic instruments such as flexible printing circuit boards (FPC). The adhesion in precision electronic instruments such as FPC, as referred to herein, means adhesion in preparing a precision electronic instrument such as FPC as described previously, or adhesion in laminating a precision electronic instrument such as FPC onto a reinforcing plate.

The invention will be described below in detail with reference to the Examples, but it should not be construed that the invention is limited to these Examples.

EXAMPLE 1

100 parts by weight of an acrylic polymer [a copolymer of butyl acrylate (BA)/acrylonitrile (AN)/acrylic acid (AA)=75/23/2 (by weight) having a weight average molecular weight of 600,000, manufactured by TORAY COATEX CO., LTD.; sometimes referred to as "acrylic polymer A"] is dissolved in ethyl acetate, thereby preparing an ethyl acetate solution of acrylic polymer A (concentration: 40% by weight).

To 100 parts by weight (solids content) of this ethyl acetate solution of acrylic polymer A, 10 parts by weight (solids content) of a resol type phenol resin [a trade name: SUMILITE RESIN PR-51283 (manufactured by SUMITOMO BAKELITE CO., LTD., weight average molecular weight: 550,000) was added, and the mixture was stirred, thereby preparing a thermosetting adhesive or pressure-sensitive adhesive composition solution.

The foregoing thermosetting adhesive or pressure-sensitive adhesive composition solution was coated on a release layer made of polyethylene of a release liner [a trade name: LL80, manufactured by LINTEC CORPORATION, which is release paper in the state that polyethylene is laminated on one surface of a paper-made substrate] in a thickness after drying of 25 μm and dried at 100° C. for 3 minutes, thereby forming a thermosetting adhesive or pressure-sensitive adhesive layer. Thereafter, a release layer made of polyethylene of a trade name "LL80" (manufactured by LINTEC CORPORATION) was superimposed on the surface of the foregoing thermosetting adhesive or pressure-sensitive adhesive layer, thereby obtaining a thermosetting adhesive or pressure-sensitive adhesive sheet.

EXAMPLE 2

100 parts by weight of an acrylic polymer [a copolymer of butyl acrylate (BA)/acrylonitrile (AN)/acrylic acid (AA)=65/30/5 (by weight) having a weight average molecular weight of 700,000, manufactured by TORAY COATEX CO., LTD.; sometimes referred to as "acrylic polymer B"] is dissolved in ethyl acetate, thereby preparing an ethyl acetate solution of acrylic polymer B (concentration: 40% by weight).

To 100 parts by weight (solids content) of this ethyl acetate solution of acrylic polymer B, 10 parts by weight (solids content) of a resol type phenol resin [a trade name: SUMILITE RESIN PR-51283 (manufactured by SUMITOMO BAKELITE CO., LTD., weight average molecular weight: 550,000) was added, and the mixture was stirred, thereby preparing a thermosetting adhesive or pressure-sensitive adhesive composition solution.

The foregoing thermosetting adhesive or pressure-sensitive adhesive composition solution was coated on a release layer made of polyethylene of a release liner [a trade name: LL80, manufactured by LINTEC CORPORATION, which is release paper in the state that polyethylene is laminated on one surface of a paper-made substrate] in a thickness after drying of 25 μm and dried at 100° C. for 3 minutes, thereby forming a thermosetting adhesive or pressure-sensitive adhesive layer. Thereafter, a release layer made of polyethylene of a trade name "LL80" (manufactured by LINTEC CORPORATION) was superimposed on the surface of the foregoing thermosetting adhesive or pressure-sensitive adhesive layer, thereby obtaining a thermosetting adhesive or pressure-sensitive adhesive sheet.

EXAMPLE 3

An ethyl acetate solution of acrylic polymer A (concentration: 40% by weight) is prepared in the same manner as in Example 1. To 100 parts by weight (solids content) of this ethyl acetate solution of acrylic polymer A, 5 parts by weight (solids content) of a resol type phenol resin [a trade name: SUMILITE RESIN PR-51283 (manufactured by SUMITOMO BAKELITE CO., LTD., weight average molecular weight: 550,000) was added, and the mixture was stirred, thereby preparing a thermosetting adhesive or pressure-sensitive adhesive composition solution.

The foregoing thermosetting adhesive or pressure-sensitive adhesive composition solution was coated on a release layer made of polyethylene of a release liner [a trade name: LL80, manufactured by LINTEC CORPORATION, which is release paper in the state that polyethylene is laminated on one surface of a paper-made substrate] in a thickness after drying of 25 µm and dried at 100° C. for 3 minutes, thereby forming a thermosetting adhesive or pressure-sensitive adhesive layer. Thereafter, a release layer made of polyethylene of a trade name "LL80" (manufactured by LINTEC CORPORATION) was superimposed on the surface of the foregoing thermosetting adhesive or pressure-sensitive adhesive layer, thereby obtaining a thermosetting adhesive or pressure-sensitive adhesive sheet.

COMPARATIVE EXAMPLE 1

A thermosetting adhesive or pressure-sensitive adhesive sheet was obtained in the same manner as in Example 1, except that a trade name "75EPS(M) CREAM (MODIFIED)" (manufactured by OJI PAPER CO., LTD., which is release paper in the state that a release treated layer by a silicone based release treating agent is formed on one surface of a paper-made substrate) was used as the release liner.

Evaluation

With respect to each of the thermosetting adhesive or pressure-sensitive adhesive sheets obtained in the Examples and Comparative Example, the haze value, the stability with time of thermosetting adhesive or pressure-sensitive adhesive layer, and the sticking strength at the ambient temperature before setting were measured or evaluated according to the following measurement method of haze value, evaluation method of stability with time of thermosetting adhesive or pressure-sensitive adhesive layer and measurement method of sticking strength, respectively.

Measurement Method of Haze Value

Each of the thermosetting adhesive or pressure-sensitive adhesive sheets prepared in the Examples and Comparative Example was laminated on a slide glass (a trade name: S-1111, manufactured by MATSUNAMI GLASS IND., LTD.), thereby preparing a specimen having a layer construction of thermosetting adhesive or pressure-sensitive adhesive layer/slide glass, and a haze value (%) of the specimen was measured using a haze meter (a trade name of unit: HM-150, manufactured by MURAKAMI COLOR RESEARCH LABORATORY). The haze value (%) was determined according to an expression: [diffuse transmittance (%)]/[total luminous transmittance (%)]×100. Also, the haze value (%) of the slide glass only was 0.4(%). The measurement or evaluation results are shown in the "Haze value (%)" row of Table 1.

The haze value can be considered as an index for affinity of the thermosetting adhesive or pressure-sensitive adhesive composition for forming the thermosetting adhesive or pressure-sensitive adhesive layer.

Evaluation Method of Stability with Time of Thermosetting Adhesive or Pressure-sensitive Adhesive Layer In storing each of the thermosetting adhesive or pressure-sensitive adhesive sheets prepared in the Examples and Comparative Example at 50° C., the number of days taken until the adhesive strength had been lowered to 80% of the adhesive strength before the storage was determined, thereby evaluating the stability with time of the thermosetting adhesive or pressure-sensitive adhesive layer. Specifically, after laminating a flexible printing circuit board (FPC, area: 5 cm×8 cm, thickness: 0.2 mm) and the thermosetting adhesive or pressure-sensitive adhesive sheet at 130° C., the laminate was cut into a width of 1 cm, stuck onto an aluminum plate (area: 5 cm×5 cm, thickness: 0.5 mm), further laminated at 130° C., heated for contact adhesion at 160° C. and at 1 MPa for 90 minutes, and further cured at 150° C. for 3 hours, thereby preparing a specimen. With respect to this specimen, its 90°-peel adhesive strength (N/cm) (by drawing the specimen at a peel rate of 50 mm/min and at 23° C.) was measured by a method of drawing from the FPC side using a unit trade name "TCM-1KNB" (manufactured by MINEBEA CO., LTD.).

Next, with respect to each of the thermosetting adhesive or pressure-sensitive adhesive sheets stored at 40° C. for the prescribed number of days, a specimen was prepared in the same manner as described above, and its 90°-peel adhesive strength (N/cm) (by drawing the specimen from the FPC side at a peel rate of 50 mm/min and at 23° C.) was then measured in the same manner as described above using a unit trade name "TCM-1KNB" (manufactured by MINEBEA CO., LTD.).

Then, in storing at 40° C., the number of days taken until the adhesive strength had been lowered to 80% of the adhesive strength before the storage was determined from these measurement results, thereby evaluating the stability with time of the thermosetting adhesive or pressure-sensitive adhesive layer. As a matter of course, the larger the number of days, the more excellent the stability with time of the thermosetting adhesive or pressure-sensitive adhesive layer is. The evaluation results are shown in the "Number of days of 80% retention of adhesive strength (stored at 40° C.)" row of Table 1.

Measurement Method of Sticking Strength

In the thermosetting adhesive or pressure-sensitive adhesive layer before setting in each of the thermosetting adhesive or pressure-sensitive adhesive sheets prepared in the Examples and Comparative Example, with respect to the influence of a silicone component coated on the release liner against the characteristics, the sticking strength (N/20 mm) at the ambient temperature (23° C.) before setting was measured according to JIS Z0237. Specifically, the thermosetting adhesive or pressure-sensitive adhesive sheet having been cut into a width of 20 mm was contact adhered to a polyimide film (a trade name: KAPTON 500V, manufactured by DuPont) through one reciprocation by a 2-kg roll, and its 180°-peel sticking strength (N/20 mm) (by drawing the thermosetting adhesive or pressure-sensitive adhesive sheet at a peel rate of 100 mm/min and at 23° C.) was measured using a unit trade name "TCM-1KNB" (manufactured by MINEBEA CO., LTD.). The measurement or evaluation results are shown in the "Sticking strength (N/20 mm)" row of Table 1.

TABLE 1

|  | Example | | | Comparative Example |
|---|---|---|---|---|
|  | 1 | 2 | 3 | 1 |
| Haze value (%) | 41 | 30 | 35 | — |
| Number of days of 80% retention of adhesive strength (stored at 40° C.) | 90 | 80 | 95 | — |
| Sticking strength (N/20 mm) | 6.8 | — | — | 5.4 |

As is evident from Table 1, the thermosetting adhesive or pressure-sensitive adhesive sheets according to the Examples are excellent in the stability with time of the thermosetting adhesive or pressure-sensitive adhesive layer. Also, in the thermosetting adhesive or pressure-sensitive adhesive sheets according to the Examples, since a release liner which does not substantially contain a silicone component is used as the release liner, no transfer of the silicone component into the thermosetting adhesive or pressure-sensitive adhesive layer occurs, and in laminating at the ambient temperature (23° C.), the sticking strength is good.

While the invention has been described in detail and with reference to specific embodiments thereof, it will be apparent to one skilled in the art that various changes and modifications can be made therein without departing from the spirit and scope thereof.

What is claimed is:

1. A thermosetting adhesive or pressure-sensitive adhesive tape or sheet having a structure in which a thermosetting adhesive or pressure-sensitive adhesive layer made of a thermosetting adhesive or pressure-sensitive adhesive composition containing an acrylic polymer (X) containing at least an alkyl(meth)acrylate (a) in which the alkyl moiety thereof has from 2 to 14 carbon atoms, a cyano group-containing monomer (b), and a carboxyl group-containing monomer (c) as monomer components and a phenol resin (Y) is protected by a release liner which does not substantially contain a silicone component, wherein in the acrylic polymer (X), a proportion of the alkyl(meth)acrylate (a) in which the alkyl moiety thereof has from 2 to 14 carbon atoms to the cyano group-containing monomer (b) to the carboxyl group-containing monomer (c) is (60 to 75)/(20 to 35)/(0.5 to 10) by weight in terms of a ratio of component (a)/component (b)/component (c).

2. The thermosetting adhesive or pressure-sensitive adhesive tape or sheet according to claim 1, wherein the release liner which does not substantially contain a silicone component is a release liner having a release layer made of polyethylene.

3. The thermosetting adhesive or pressure-sensitive adhesive tape or sheet according to claim 2, wherein the polyethylene has a specific gravity of from 0.910 to 0.940.

4. The thermosetting adhesive or pressure-sensitive adhesive tape or sheet according to claim 2, wherein the release layer made of polyethylene has a thickness of from 20 to 30 μm.

5. A flexible printing circuit board comprising the thermosetting adhesive or pressure-sensitive adhesive tape or sheet according to claim 1, a conductive metal foil and a substrate.

6. The flexible printing circuit board according to claim 5 further comprising a reinforcing plate.

7. A process of producing a thermosetting adhesive or pressure-sensitive adhesive tape or sheet according to claim 1, which comprises coating a thermosetting adhesive or pressure-sensitive adhesive composition comprising a mixture of an acrylic polymer (X) containing at least an alkyl(meth)acrylate (a) in which the alkyl moiety thereof has from 2 to 14 carbon atoms and a cyano group-containing monomer (b) as monomer components and a phenol resin (Y) on the release surface of a release liner which does not substantially contain a silicone component and then drying to form a thermosetting adhesive or pressure-sensitive adhesive layer.

* * * * *